(12) United States Patent
Nyang et al.

(10) Patent No.: US 8,352,598 B2
(45) Date of Patent: Jan. 8, 2013

(54) METHOD OF PROVIDING COMPLETELY AUTOMATED PUBLIC TURING TEST TO TELL COMPUTER AND HUMAN APART BASED ON IMAGE

(75) Inventors: DeaHun Nyang, Seoul (KR); Jeonil Kang, Gongju (KR)

(73) Assignee: Inha-Industry Partnership Institute, Incheon (KR)

( * ) Notice: Subject to any disclaimer, the term of this patent is extended or adjusted under 35 U.S.C. 154(b) by 1291 days.

(21) Appl. No.: 11/963,844

(22) Filed: Dec. 23, 2007

(65) Prior Publication Data

US 2009/0138723 A1    May 28, 2009

(30) Foreign Application Priority Data

Nov. 27, 2007  (KR) .................. 10-2007-0121438
Dec. 7, 2007   (KR) .................. 10-2007-0127208

(51) Int. Cl.
  *G06F 15/16*   (2006.01)
  *G06F 12/00*   (2006.01)
(52) U.S. Cl. ........ 709/225; 709/201; 709/206; 709/203; 709/229; 709/250; 709/223; 713/182; 713/183; 713/169; 713/170; 726/6; 726/7; 726/17; 726/23; 705/71
(58) Field of Classification Search .............. 726/3
See application file for complete search history.

(56) References Cited

U.S. PATENT DOCUMENTS

| | | | |
|---|---|---|---|
| 7,516,220 B1 * | 4/2009 | Stiert ........................ 709/225 |
| 2007/0156592 A1 * | 7/2007 | Henderson .................. 705/51 |
| 2008/0049939 A1 * | 2/2008 | Canetti et al. .............. 380/277 |
| 2008/0066040 A1 * | 3/2008 | Taylor et al. ................ 716/10 |
| 2008/0072293 A1 * | 3/2008 | D'Urso ........................ 726/4 |

FOREIGN PATENT DOCUMENTS

| | | |
|---|---|---|
| JP | 2005-322214 A | 11/2005 |
| WO | 2007-106261 A1 | 9/2007 |

\* cited by examiner

*Primary Examiner* — Nathan Flynn
*Assistant Examiner* — Bryan Wright
(74) *Attorney, Agent, or Firm* — Edwards Wildman Palmer LLP

(57) ABSTRACT

Disclosed is a method of providing a completely automated public turing test to tell a computer and a human apart (CAPTCHA) based on image. The method comprises the steps of: storing a plurality of randomly-selected images by session when a request for a web page is received from a user client; providing the web page and a session ID to the user client; generating a test image by mixing the plurality of images when a request for a test image corresponding to the session ID is received from the user client; transmitting the generated test image to the user client; receiving at least one of first identification information inputted by the user about the test image from the user client; and comparing the first identification information with second identification information included in Meta information of the test image.

18 Claims, 13 Drawing Sheets

METHOD OF PROVIDING COMPLETELY AUTOMATED PUBLIC TURING TEST TO TELL COMPUTER AND HUMAN APART BASED ON IMAGE

CROSS-REFERENCE TO RELATED APPLICATIONS

This application is based on and claims priority from Korean Patent Applications Nos. 10-2007-0121438 filed on Nov. 27, 2007 and 10-2007-0127208 filed on Dec. 7, 2007, the disclosures of which are incorporated herein in its entirety by reference.

BACKGROUND

1. Technical Field

The present disclosure relates to a completely automated public turing test to tell computers and humans apart (CAPTCHA).

2. Background Art

CAPTCHA was suggested by Luis von Ahn, and refers to a public turing test that determines whether a user is a human or a computer. Such a CAPTCHA presents a question that can be easily solved by a human, but cannot be solved by a computer, which has been used for authenticating a user in various fields such as an online vote, a free e-mail registration, and an online community registration. The CAPTCHA can use text, image, sound or logic questions, but text-based questions have been mainly used because of their easy implementation, as shown in FIG. 1. As illustrated in FIG. 1, the text-based CAPTCHA displays a modified text, and asks what the displayed text is.

In the case of the currently used text-based CAPTCHA, when a text is severely modified, even a human cannot identify the text, so the text should be modified to an appropriate extent. However, as the text is basically modified in two dimensions, there is a limit in modification.

Further, the text-based CAPTCHA can be incapacitated by an AI technique, and has low accessibility.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

An object of the invention is to provide a method of providing an image-based CAPTCHA by mixing and modifying two or more images.

Another object of the invention is to provide a method of providing an image-based CAPTCHA, which can perform CAPTCHA on a user client side.

In one aspect, the present invention provides a method of providing an image-based CAPTCHA, the method comprising the steps of: storing a plurality of randomly-selected images by session when a request for a web page is received from a user client; providing the web page and a session ID to the user client; generating a test image by mixing the plurality of images when a request for a test image corresponding to the session ID is received from the user client; transmitting the generated test image to the user client; receiving first identification information inputted by the user client about the test image; and comparing the first identification information with second identification information included in Meta information of the test image.

In a preferred embodiment, the method may further comprise the step of allowing user access when more than a predetermined number of the first identification information coincide with the second identification information.

In another preferred embodiment, the mixing of the plurality of images in the step of generating the test image is performed by overlaying or substituting the images.

In still another preferred embodiment, in the step of generating the test image, at least one of the plurality of images is modified by image rotation, noise addition, erasure, distortion, brightness change, contrast change, blur, softness, image magnification, image reduction, image color replacement, or combination thereof.

In yet another preferred embodiment, the generating of the test image in the step of generating the test image may comprise the steps of: mixing the plurality of images; and modifying at least one portion of the mixed image by image rotation, noise addition, erasure, distortion, brightness change, contrast change, blur, softness, image magnification, image reduction, image color replacement, or combination thereof.

In still yet another preferred embodiment, the plurality of images may include at least one three-dimensional object.

In a further preferred embodiment, the plurality of images are photographed by an image-photographing means.

In another further preferred embodiment, the session ID is provided along with the session start time information, hash values of the second identification information produced by the hash function, salt information for producing the hash values of the second identification, and signature value generated by signing the session start time information, the hash values of the second identification information, and the salt information using a secret key in the step of providing the web page.

In still another further preferred embodiment, the method may further comprise the step of terminating the session by deleting the session-related information after the step of providing the test image.

In another aspect, the present invention provides a method of providing an image-based CAPTCHA, the method comprising the steps of: storing a plurality of randomly-selected images by session when a request for a web page is received from a user client; providing the web page, a session ID and first identification information for each of the plurality of images to the user client; generating a test image by mixing the plurality of images when a request for the test image corresponding to the session ID is received from the user client; and transmitting the generated test image to the user client.

In a preferred embodiment, the method may further comprise the step of allowing user access when it is determined by the user client that more than a predetermined number of second identification information inputted by the user client about test image coincide with the first identification information.

In another preferred embodiment, the first identification information are provided to the user client in the form of hash values produced using the hash function and randomly-selected salt information.

In still another preferred embodiment, the mixing of the plurality of images in the step of generating the test image is performed by overlaying or substituting the images.

In yet another preferred embodiment, at least one of the plurality of images is modified by image rotation, noise addition, erasure, distortion, brightness change, contrast change, blur, softness, image magnification, image reduction, image color replacement, or combination thereof.

In yet still another preferred embodiment, the generating of the test image in the step of generating the test image comprises the steps of: mixing the plurality of images; and modifying at least one portion of the mixed image by image rotation, noise addition, erasure, distortion, brightness change, contrast change, blur, softness, image magnification, image reduction, image color replacement, or combination thereof.

In a further aspect, the present invention provides an image-based CAPTCHA, the method comprising the steps of: generating a test image by mixing a plurality of images; providing the test image to a user client; receiving first identification information for identifying the test image from the user client; and comparing the received first identification information with second identification information included in Meta information of the test image.

In a preferred embodiment, the generating the test image in the step of generating the test image comprises the steps of: mixing the plurality of images by overlaying or substituting the images; and modifying at least one portion of the mixed image by image rotation, noise addition, erasure, distortion, brightness change, contrast change, image magnification, image reduction, image color replacement, or combination thereof.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
FIG. 1 illustrates a test-based CAPTCHA according to the prior art.
Figure 2:
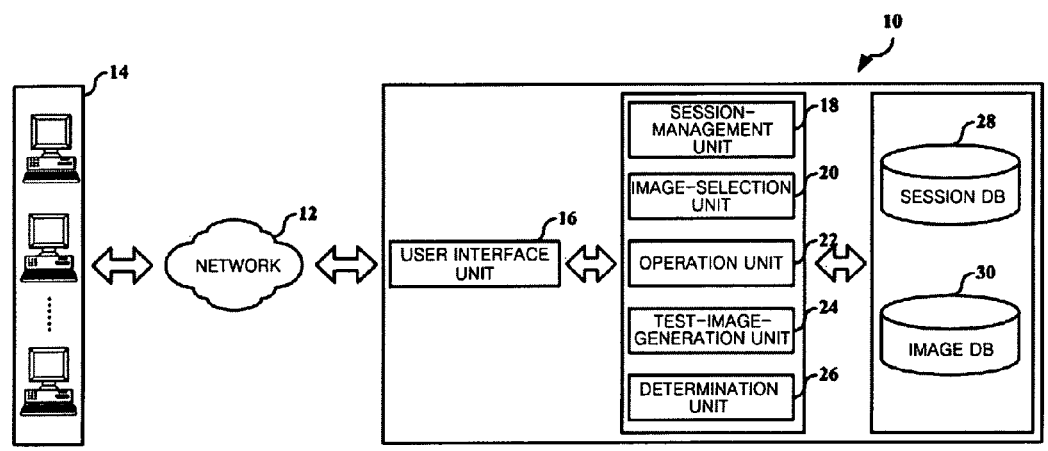
FIG. 2 illustrates the configuration of a network to which an image-based-CAPTCHA-providing system according to a preferred embodiment of the present invention is applied.

FIG. 2 illustrates a network configuration to which an imaged-based CAPTCHA providing system according to a preferred embodiment of the present invention is applied. The image-based CAPTCHA-providing system 10 is connected to a user client 14 via a network 12, and provides an image-based CAPTCHA (hereinafter, called a "test image") to the user client, and determines if access by the user client 14 is permitted depending on the response from the user client 14 who received the CAPTCHA test image.

Here, the network 12 refers to a stateless network. The stateless network refers to a network that does not keep the state value in network connection, and uses a protocol such as HTTP protocol.

The image-based CAPTCHA-providing system 10 includes a user-interface unit 16, a session-management unit 18, an image-selection unit 20, a test-image-generation unit 24, a determination unit 26, a session-information database 28, and an image database 30.

The user-interface unit 16 provides connection to the user client 14. Specifically, the user-interface unit 16 receives a web-page request and/or a test-image request from the user client 14, and provides the web page and the test image to the user client 14. Here, the web page provided by the user-interface unit 16 can include various information and predetermined values as variables.

The user-interface unit 16 receives one or more words inputted by a user about the provided test image, and other various information for determining if user access is permitted.

The session-management unit 18 manages generation and termination of a session. When a request for a web page is received through the user-interface unit 16, the session-management unit 18 grants a session ID to each session. Further, when certain conditions are satisfied, the session-management unit 18 deletes session-related information to terminate the generated session.

Generally, if there is no response from the user client 14 for a certain period of time or a web browser is terminated, a session-management unit terminates the session. However, the session-management unit can terminate a generated session by deleting session-related information when a test image is provided, in order to reduce the overload of the image-based CAPTCHA-providing system 10 by keeping the session for a short period of time.

Further, when the image-selection unit 20 selects two or more images, the session-management unit 18 stores the selected images and Meta information for each image along with each session ID in the session database 28.

Figure 3:
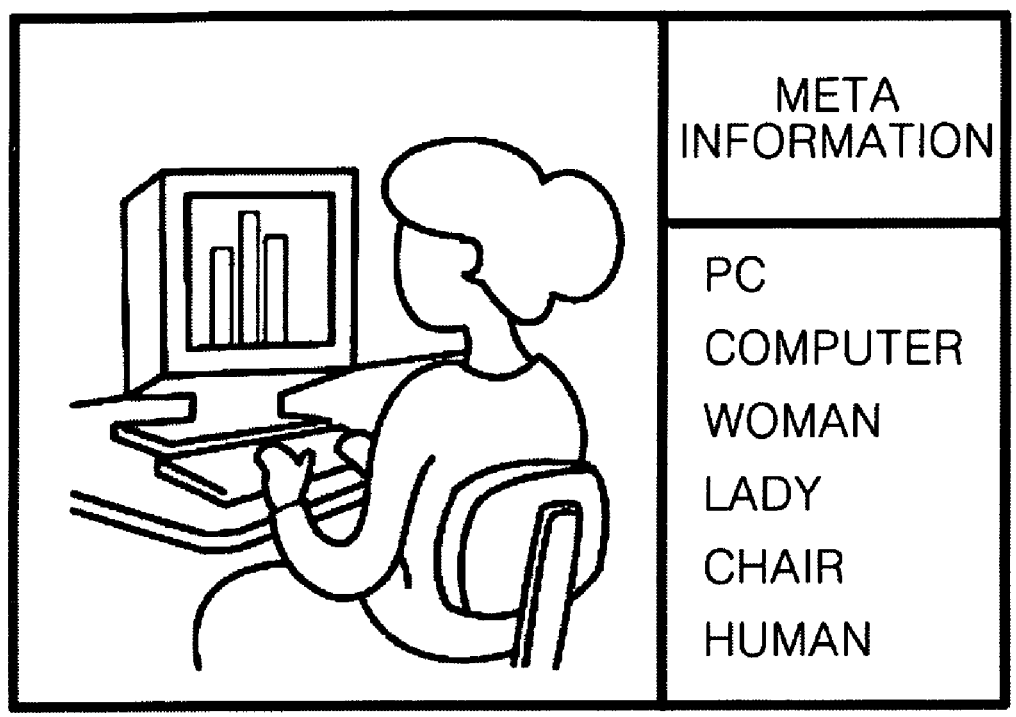
FIG. 3 illustrates an example of a certain image and words that can be included in Meta information of the image.

Here, the Meta information includes words that indicate objects included in each image. For example, referring to FIG. 3, because an image includes objects such as a computer, a chair and a human, the Meta information includes words such as "computer", "chair" and "human". Here, if there is space between words, it is preferable to include words that disregard space in the Meta information.

Further, because a given object can be indicated by various words, Meta information can include various words for the object. For example, referring to FIG. 3, "computer" or "PC" can be used for the object "computer", and "woman", "girl" or "lady" can be used for the object "human".

In addition, the session-management unit 18 provides session ID and session start time information to the user-interface unit 16 so that the session ID and session start time information can be included in a provided web page when the user-interface unit 16 provides the web page to the user client 14.

When a request for a web page is received through the user-interface unit 16, the image-selection unit 20 randomly selects two or more images from the image database 30, and stores the selected images and Meta information for the selected images in the session database 28 through the session-management unit 18.

The operation unit 22 randomly selects salt values, and produces hash values for words included in the Meta information of the selected images using the selected salt values and the hash function, which is described in the following equation.

$$h(\tau|x_1), h(\tau|x_2), \ldots, h(\tau|x_n) \qquad \text{Equation 1}$$

Here, τ refers to the salt value, and $x_n$ refers to words included in the Meta information. In one embodiment of the present invention, the operation unit 22 can use a hash function such as MD5 or SHA-1 to produce the hash value for words included in the Meta information.

In another embodiment of the present invention, if the number of words included in the Meta information for each image is smaller than a predetermined value, n, the (lacking) hash values can be substituted by random numbers.

Further, the operation unit 22 generates a long-term secret (e.g., secret key) K of the image-based CAPTCHA-providing system 10, and signs session start time information, salt values, and hash values of words included in Meta information using the long-term secret K to generate signature value (SIG), which is described in the following Equation.

$$\text{SIG}=E_k(h(t, \tau, h(\tau|x_1), h(\tau|x_2), \ldots, h(\tau|x_n))) \qquad \text{Equation 2}$$

As illustrated in Equation 2, the operation unit 22 generates a hash value for session start time information, salt values, and hash values of words included in Meta information using a hash function, and signs the hash value using the long-term secret K to generate signature value.

Further, when the user-interface unit 16 provides the requested web page to the user client 14, the operation unit 22 provides the salt values, hash values of words included in the Meta information, and signature value to the user-interface unit 16 so that the values can be included in the web page as variables.

When there is a request for a test image corresponding to a session ID provided to the user client 14 through the user-interface unit 16, the test-image-generation unit 24 generates a test image by mixing or modifying two or more images, which are mapped with the session ID, stored in the session database 28, and provides the generated test image to the user client through the user-interface unit 16.

In one embodiment of the present invention, the test-image-generation unit 24 generates a test image by overlaying at least one portion of the images stored in the session database 28. Here, the alpha transparency of the overlaid image is randomly selected within the range that can be distinguished by a human. Such an image overlay uses the fact that when the pixel value of a certain pixel and the pixel value of an adjacent pixel of the pixel are similar, the computer cannot identify it.

Figure 4A:
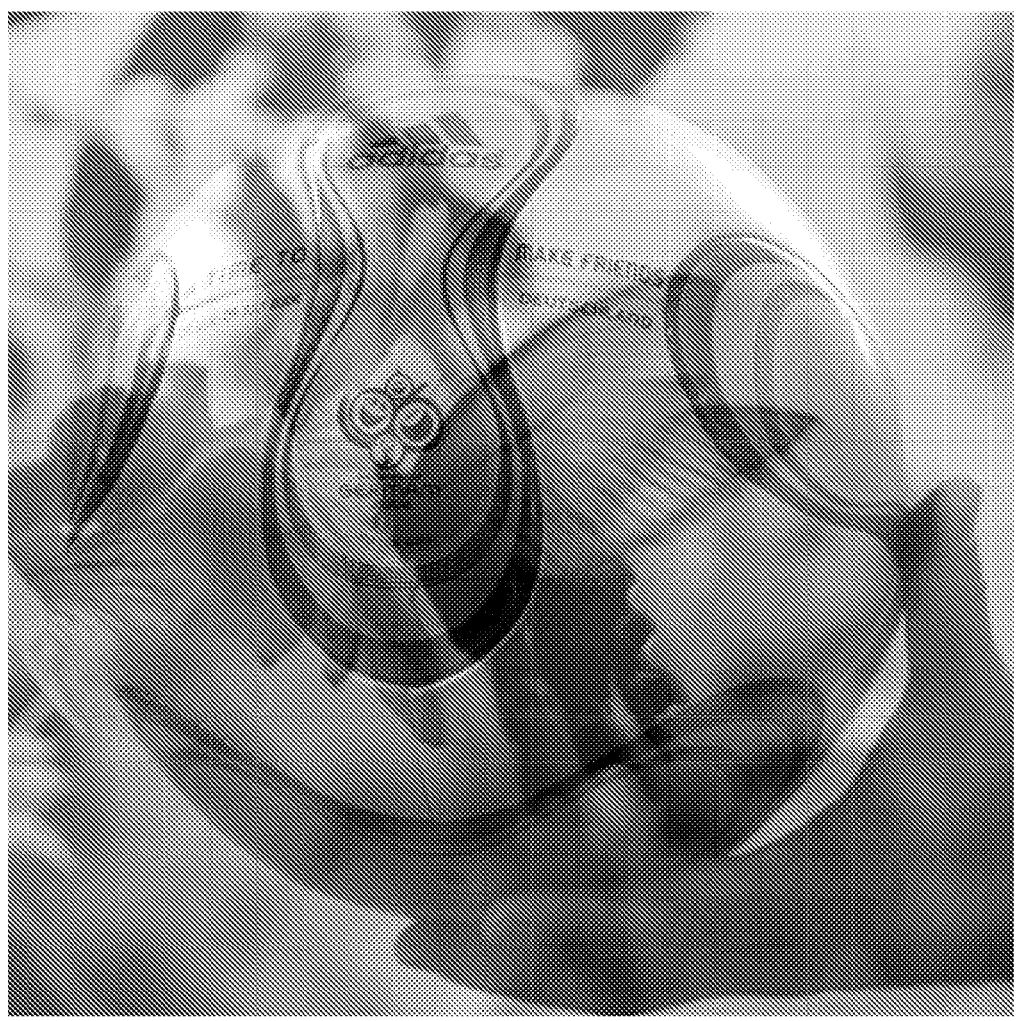
FIG. 4 illustrates a test image generated using an image mixture according to a preferred embodiment of the present invention.

FIG. 4A illustrates an example of a test image generated through an image-overlay process.

In another embodiment of the present invention, the test-image-generation unit 24 generates a test image by substituting at least one portion of the images stored in the session database 28. For example, at least one portion of a given image can be substituted by a randomly-selected different image. Here, if the size of an area to be substituted is too large or too small in an image, a human cannot recognize it, so it is desirable to set the size of an area to be substituted in a range that can be recognized by a human.

Figure 4B:
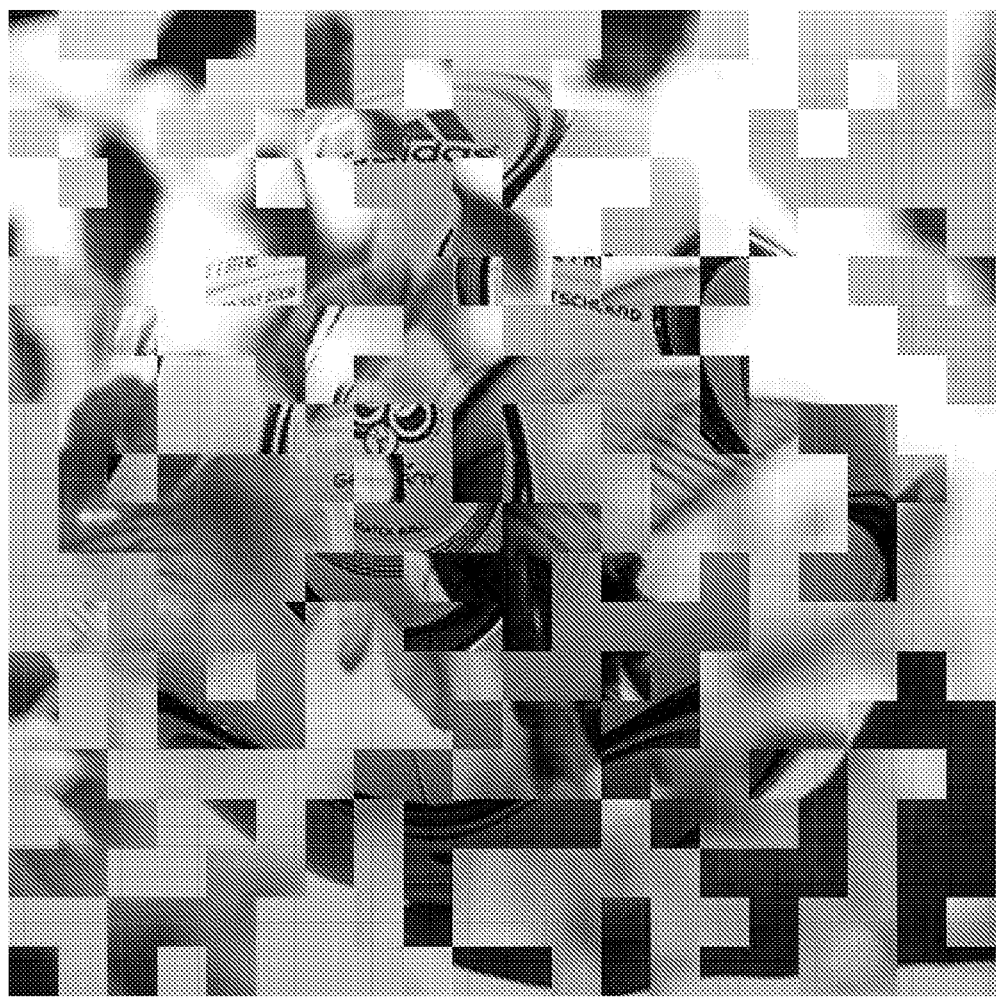
Figure 5A:
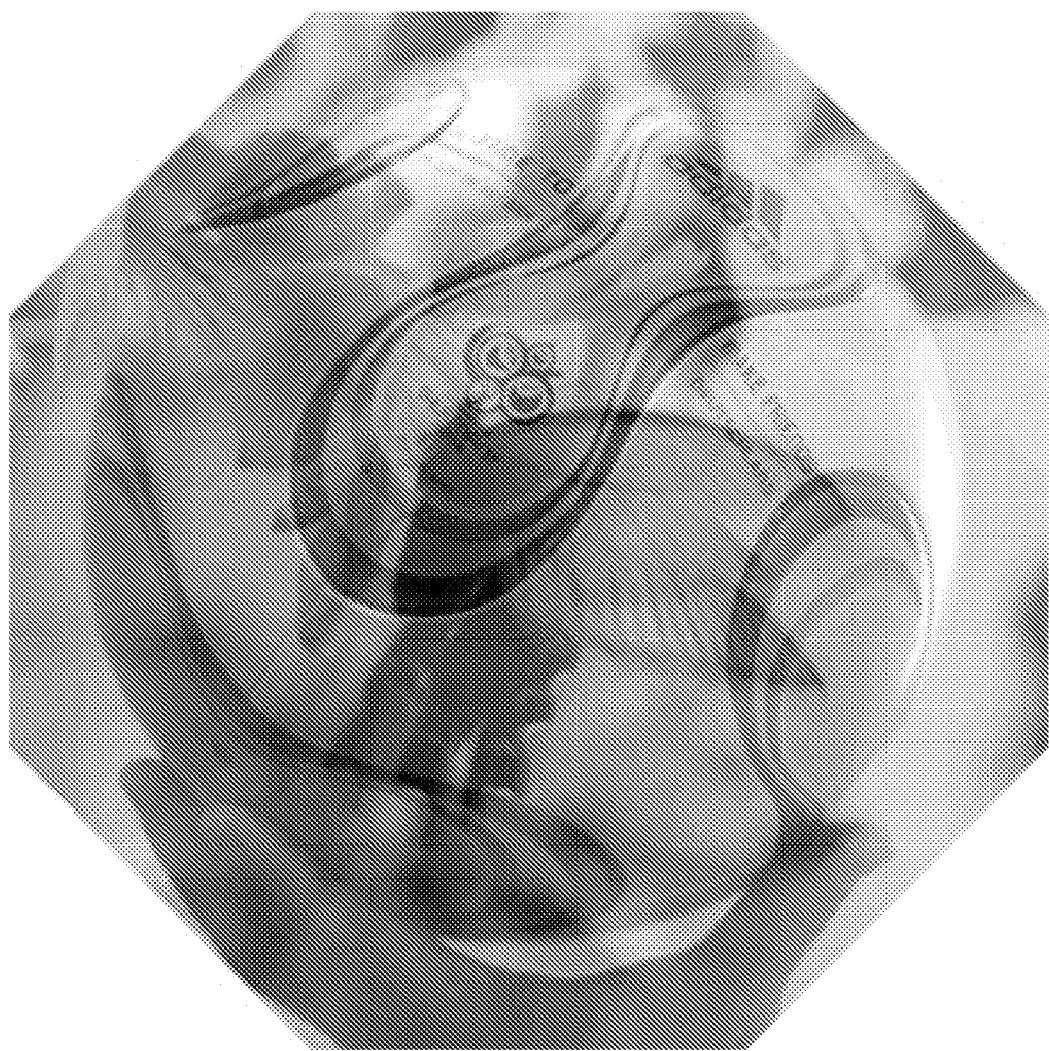
FIG. 5 illustrates a test image generated using an image modification according to a preferred embodiment of the present invention.
Figure 5B:
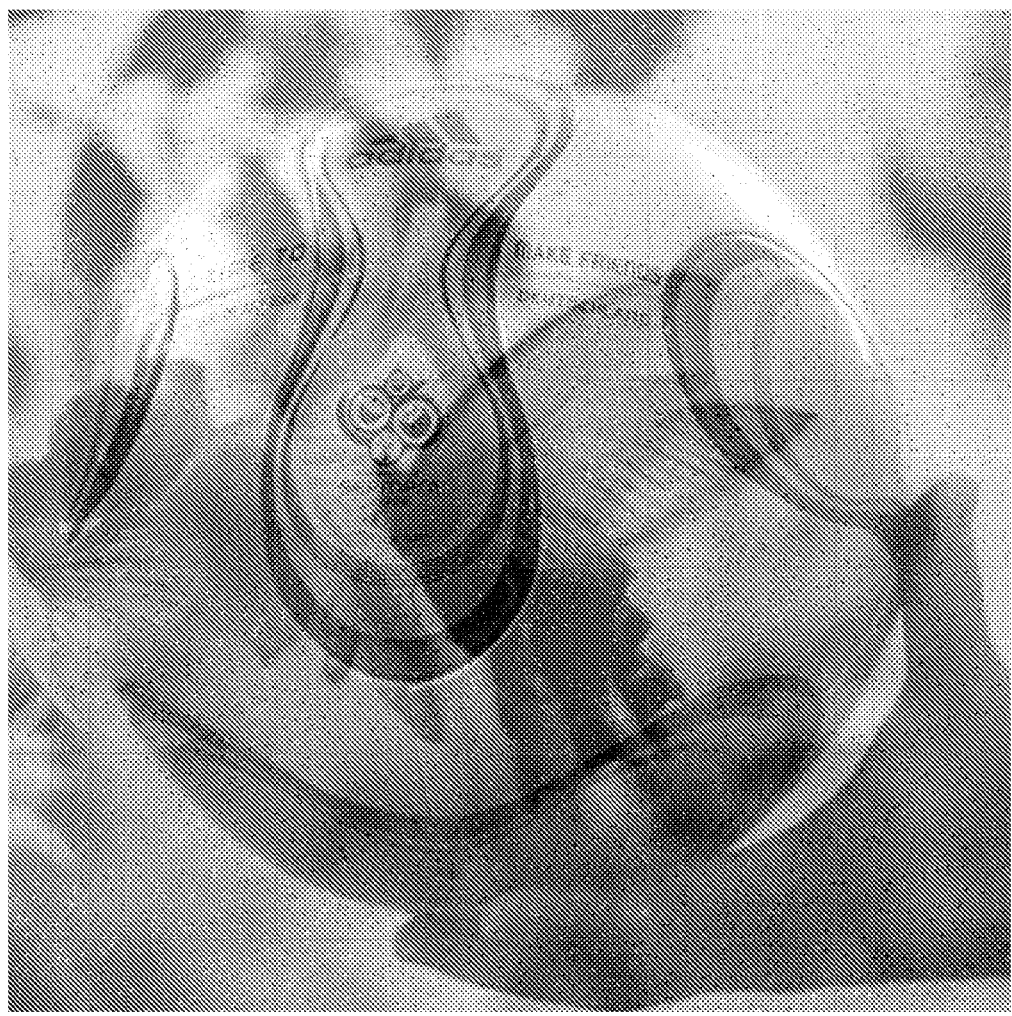
Figure 5C:
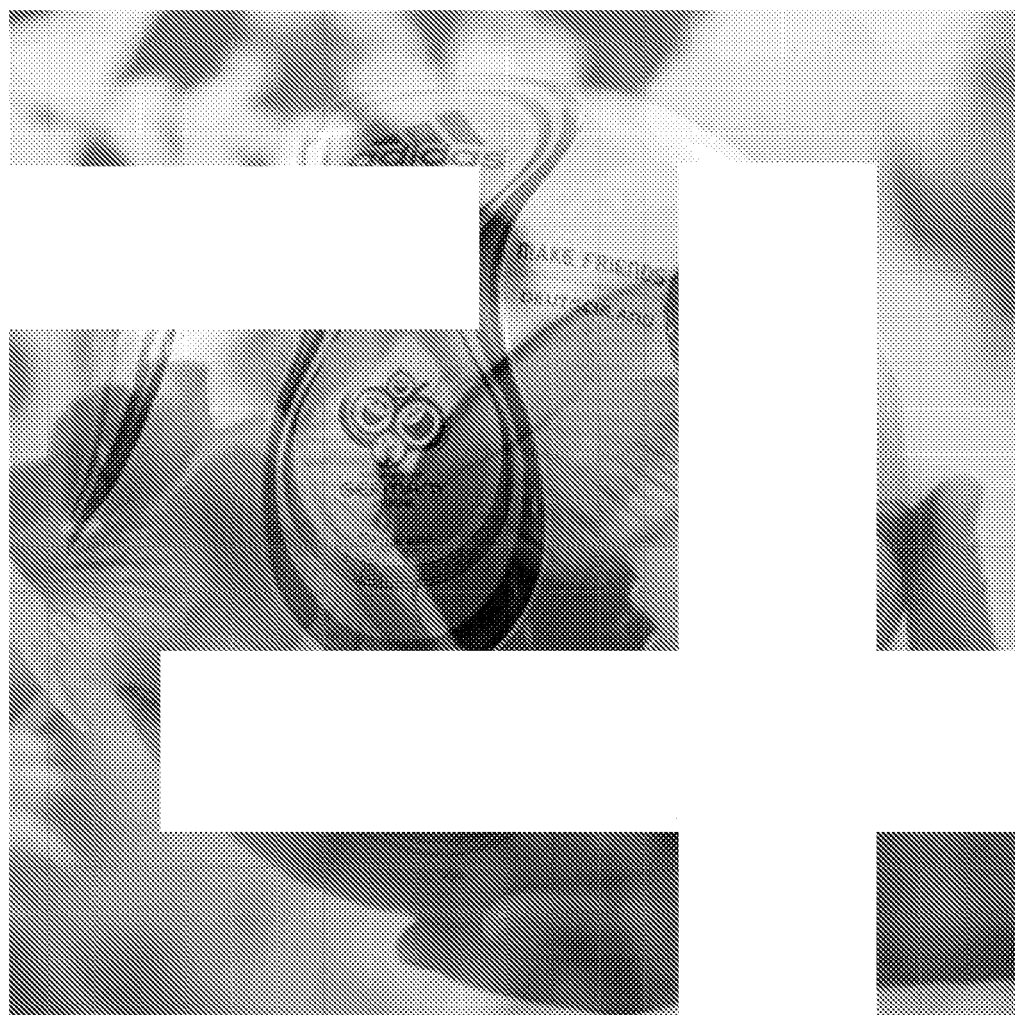
Figure 5D:
Figure 5E:
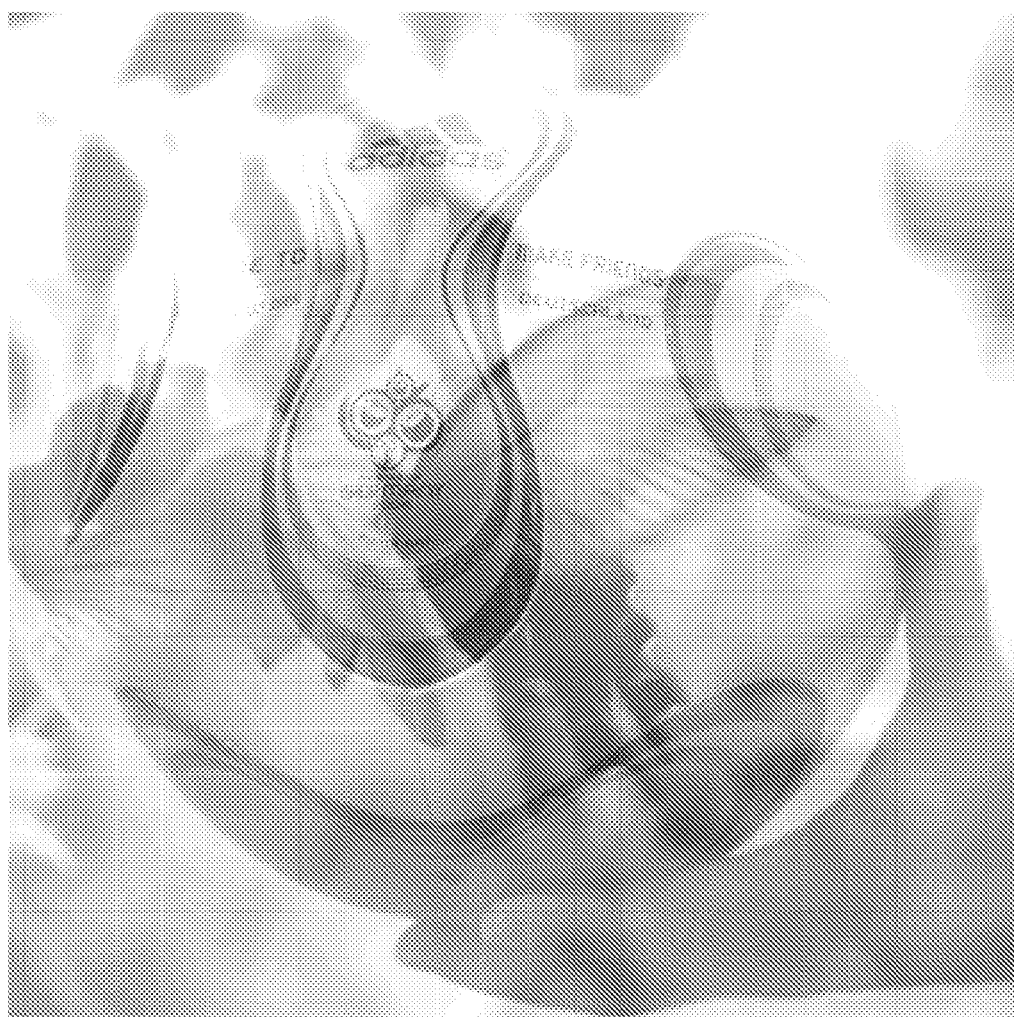
Figure 5F:

FIG. 4B illustrates an example of a test image generated through an image-substitution process.

In the aforementioned embodiment, the test-image-generation unit 24 uses an image overlay and an image substitution as a method of mixing images to generate a test image, but the present invention is not limited to such the image-mixing methods.

In another embodiment of the present invention, the test-image-generation unit 24 can modify mixed images using various image-modifying methods. For example, the test-image-generation unit 24 can modify mixed images using at least one of the methods including rotation, noise addition, erasure, distortion, brightness change and contrast change.

Here, rotation refers to randomly rotating an image within 360° in the right and left direction, noise addition refers to selecting one or more colors and randomly spreading the colors on the image, and erasure refers to removing a portion of the image. Further, distortion refers to distorting an image, brightness change refers to changing the brightness of the image, and contrast change refers to changing the contrast of the image. Here, noise addition can be essentially applied for a perfect image modification.

FIG. 5 illustrates an example of modifying an image by applying rotation, noise addition, erasure, distortion, brightness change and contrast change to a mixed image. FIG. 5A illustrates an example of modifying an image using rotation, FIG. 5B illustrates an example of modifying an image using noise addition, FIG. 5C illustrates an example of modifying an image using erasure, FIG. 5D illustrates an example of modifying distortion, FIG. 5E illustrates an example of modifying an image using brightness change, and FIG. 5F illustrates an example of modifying an image using contrast change.

However, in addition to these methods, softness that softens an image, a blur that blurs an image, image magnification, image reduction or image color replacement can also be used.

In the aforementioned embodiment, the test-image-generation unit 24 mixes images, and modifies the mixed image, but it is possible to modify at least one image among the selected two images, and then mix the modified images.

The test-image-generation unit 24 provides a test image generated by the aforementioned process(es) to the user client through the user-interface unit 16.

Further, in the case where there is no image corresponding to the session ID, the test-image-generation unit 24 generates an error message, and transmits the generated error message to the user client 14 through the user-interface unit 16.

The determination unit 26 receives one or more words inputted by a user about the provided test image through the user-interface unit 16, and determines whether user access is allowed. Here, the determination unit 26 receives various sets of information to determine the user access. The various sets of information include session start time information, salt values, hash values of words included in Meta information and their signature value.

The determination unit 26 determines the validity of the session before the determination of the user access. In one embodiment of the present invention, determining the validity of the session can be implemented by three steps.

First, the determination unit 26 compares session start time information received from the user client 14 and current time information, and determines whether the difference is more than a predetermined value. If the difference is more than the predetermined value, the session is not valid, so user access is not allowed.

Then, in the case where the difference is less than the predetermined value, the determination unit 26 determines whether the words inputted by the user have been already used. If the words have been already used, the session is not valid and user access is not allowed.

The object of the aforementioned process is to prevent an access by an invader when the invader finds out the inputted word for the test image, and retransmits the word inputted by the user within a valid time period.

For this, the determination unit 26 can store words received from user clients allowed to access in a separate database base (not shown), and the determination unit 24 can determine the access by the user client 14 by checking whether words received by the user client 14 exists in the separate database. Here, it is desirable for the words stored in the separate database to be stored only while the session is valid.

Finally, if the difference between the session start time information and the current time information is less than a predetermined value, and words received by the user client 14 is not stored in a separate database, the determination unit 26 determines whether a signature value, which is generated by signing the session start time information, salt values, and hash values of words included in the Meta information transmitted from the user client using the long term secret K, coincide with the signature value transmitted from the user client 14. If the generated signature value does not coincide with the transmitted signature value, the session is not valid, so user access is not allowed.

If the above three conditions are satisfied, the session is valid, so the determination unit 26 extracts words from hash values of words included in the Meta information transmitted from the user client 14, and compares extracted words with the words inputted by the user about the test image. Here, if there is a space in extracted words or words inputted by the user, it is desirable to compare the words after removing the space.

As a result of the comparison, if more than a certain number of words among words inputted by the user about the test image coincide with the extracted words, the determination unit 26 can allow user access.

For example, it is assumed that the access is allowed if a test image, as shown in FIG. 4, is provided to the user client 14, several words such as "ball", "soccer ball", "butterfly", "hand" and "flower" are extracted from hash values of words included in the Meta information transmitted from the user client 14, and two or more words among words inputted by the user about the test image coincide with the extract words.

First, if the words "ball" and "hand" are inputted by the user about the test image, the "ball" and the "hand" coincide with two of the extract words, so user access is allowed.

On the other hand, if the words "desk" and "chair" are inputted by the user, the inputted words do not coincide with the extract words, user access is not allowed.

In the aforementioned embodiment, the determination unit 26 checks three conditions to determine the validity of a session, but it is still possible to determine the validity by at least one of the three conditions. Further, in the aforementioned embodiment, three conditions are checked in order, but it is still possible to check the three conditions randomly.

Further, in the aforementioned embodiment, the image-based-CAPTCHA-providing system performs a determination process to determine the access by the user client, but it is still possible for the user client to perform such a determination process. For this, an agent program such as a scripter or an Active X control can be installed in advance to perform such a determination process.

That is, such an agent program installed in the user client extracts words from hash values of words included in the Meta information transmitted from the image-based-CAPTCHA-providing system, and then determines whether more than a certain number of words among the words inputted by the user about the test image coincide with the extract words.

According to the embodiment, because the validity about the test image does not need to be checked, the operation unit 22 does not need to generate a signature value in the image-based-CAPTCHA-providing system 10, and because the function of the determination unit 24 can be implemented by a program installed in the user client 14, there is no need for a determination unit 24.

Further, the user client 14 does not need to transmit words inputted by the user and various sets of information for determining the access by the user client to the image-based-CAPTCHA-providing system 10. The user client 14 can transmit only the result of the determination.

The selected images and Meta information for the images are stored along with the session IDs in the session database 28, and the various images are stored along with Meta information for each image in the image database 30. In one embodiment of the present invention, it is desirable to use images photographed by an image-photographing means for images stored in the image database 30.

Further, an object included in each image can be two-dimensional or three-dimensional.

Figure 6:
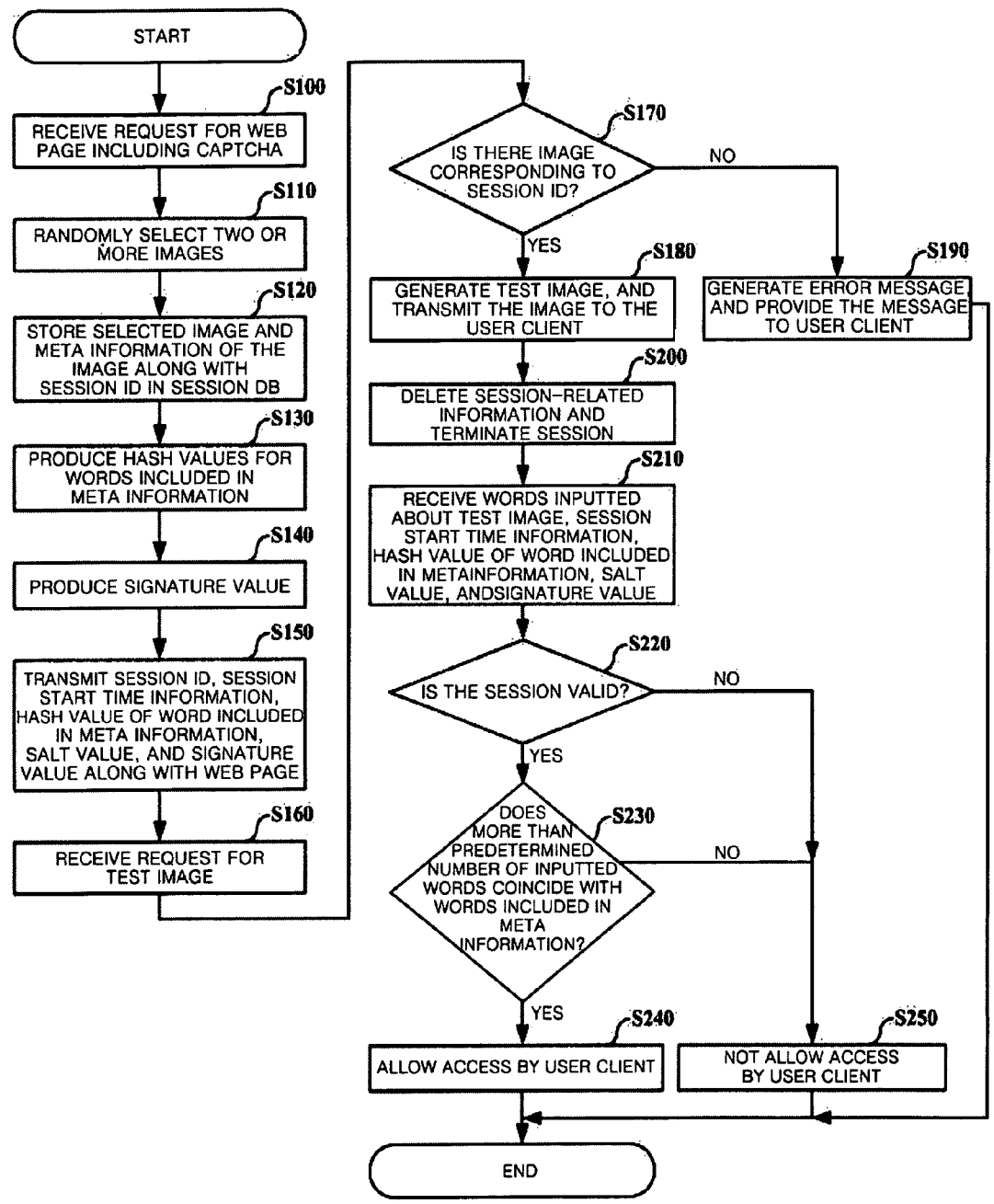
FIG. 6 is a flowchart illustrating a method of providing an image-based CAPTCHA according to a first preferred embodiment of the present invention.

FIG. 6 is a flowchart illustrating a method of providing an image-based CAPTCHA according to one embodiment of the present invention.

As illustrated, when a request for a web page including a CAPTCHA is received from a user client (S100), two or more images are randomly selected from the image database (S110). Then, the selected two or more images and the Meta information for the images are stored along with the session IDs granted to each session in the session database (S120).

Next, salt values are randomly selected, and hash values for one or more words included in the Meta information for each image are produced using the hash function (S130). Then, a signature value is generated by signing the hash values, the session start time information, and the salt values using the long term secret K of the image-based-CAPTCHA-providing system (S140).

Next, the web page corresponding to the web-page request received from the user client is provided along with the session ID to the user client (S150). Here, the signature value generated in the step S140, the hash values, the session start time information, and the salt values are transmitted to the user client as variables of form or scripter included in the web page.

Then, if the web page provided to the user client is loaded to the user client, a request for a test image corresponding to the session ID is received from the user client (S160). In one embodiment of the present invention, a request for a test image received from the user client can be performed in a tag form such as <img src=" . . . /genimage.php?session=Λ" border="0"/>.

In accordance with the request for a test image, it is determined whether there are images for the session ID within the session database (S170). If there are such images, a test image is generated by mixing or modifying two or more images stored in the session database, and is then provided to the user client (S180).

In one embodiment of the present invention, two or more images are mixed by an image overlay or image substitution, and then a test image is generated by modifying the mixed image using modification methods such as rotation, noise addition, erasure, distortion, brightness change, contrast change, softness, blur, image magnification, image reduction and image color contrast.

In a modified embodiment, first, at least one of the two or more images is modified using at least one of the modification methods such as rotation, noise addition, erasure, distortion, brightness change, contrast change, softness, blur, image magnification, image reduction and image color contrast, and the modified images can then be mixed using the image overlay or image substitution.

Further, as a result of the determination in step S170, if there is no image corresponding to the session ID in the session database, an error message is generated, and the message is then provided to the user client (S190). Then, the session is terminated by deleting session-related information stored in the session database (S200).

Next, if one or more words about the test image are inputted by the user, one or more words inputted by the user about the test image, session start time information, salt values, hash values of words included in the Meta information, and signature value are received from the user client (S210).

Then, the validity of the session is determined using information received from the user client (S220). In one embodiment of the present invention, the validity of the session can be determined using at least one of the following criteria: whether the difference between the session start time information and the current time information is less than a predetermined value; whether the words inputted by the user are stored in a separate database; and whether a signature value, which is generated by signing the session start time information, salt values, and hash values of words included in the Meta information transmitted from the user client using the long term secret K of the image-based CAPTCHA providing system, coincide with the signature values transmitted from the user client. This determination procedure is described in detail above with regard to the determination unit 26.

As a result of the determination, if the test image is valid, the words inputted by the user about the test image and extract words from the hash value transmitted the user client are compared (S230). Here, the extracted words are same words included in the Meta information of the selected image. As a result of the comparison, if more than a certain number of words among the words inputted by the user coincide with the extract words, user access is allowed (S240). Otherwise, it is not allowed (S250).

Further, as a result of the determination in step S220, if the session is invalid, user access is not allowed (S250).

Figure 7:
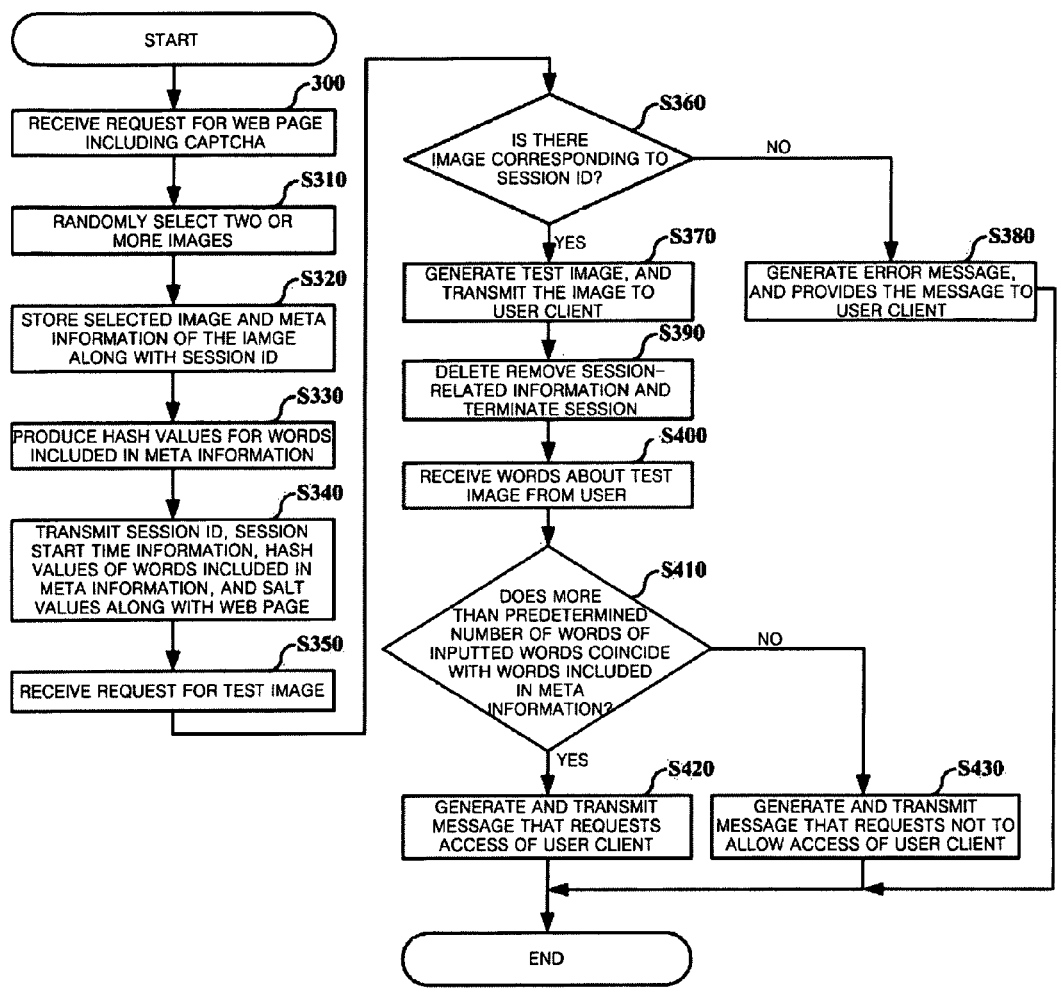
FIG. 7 is a flowchart illustrating a method of providing an image-based CAPTCHA according to a second preferred embodiment of the present invention.

FIG. 7 is a flowchart illustrating a method of providing an image-based CAPTCHA according to another embodiment of the present invention. The method of providing an image-based CAPTCHA illustrated in FIG. 7 is the same as that illustrated in FIG. 6, except that the determination process of the user access is performed on user client side.

Specifically, the step of receiving a request for a web page (S300), the step of selecting two or more images (S310), the step of storing the selected images and the Meta information for each image (S320), and the step of producing hash values for the words included in the Meta information for each image (S330) are the same as those illustrated in FIG. 6, except that the step of producing signature value illustrated in FIG. 6 is not necessary in the method illustrated in FIG. 7 because the determination whether user access is allowed is determined on the user client side.

Then, a web page is provided to the user client (S340). Here, hash values, which are for one or more words included in the Meta information for each image, produced in step 330, session start time information, and salt values are transmitted to the user client as variables of form or scripter included in the web page. That is, signature value were transmitted together in the method illustrated in FIG. 6, but the signature values do not need to be transmitted in the method illustrated in FIG. 7.

Then, when a request for a test image corresponding to the session ID is received from the user client (S350), it is determined whether there is any image about the session ID in the session database (S360). As a result of the determination, if there is any image, a test image is generated, and the generated image is provided to the user client (S370). If there is no image, an error message is generated, and the error message is provided to the user client (S380).

Then, the session is terminated by deleting session-related information stored in the session database (S390).

Next, when one or more words are inputted by the user for a test image (S400), the user client compares extracted words the hash values transmitted the image-based CAPTCHA providing system in the step S340, and the words inputted by the user (S410). Here, the extracted words are same words included in the Meta information of the selected image. As a result of the comparison, if more than a certain number of words among the words inputted by the user coincide with the extracted words, a message that requests an access by the user client is generated, and the generated message is transmitted to the image-based-CAPTCHA-providing system (S420), otherwise a message that the access by the user client is not allowed is generated, and the generated message is transmitted to the image-based-CAPTCHA-providing system (S430).

The image-based-CAPTCHA-providing system determines the access by the user client depending on the type of the message received from the user client.

In the aforementioned embodiments, the image-based-CAPTCHA-providing system provides image-based CAPTCHA when the system is connected to the user client using a stateless network, but in a modified embodiment, the image-based CAPTCHA can be provided when the system is connected to the user client using a stateful network.

Figure 8:
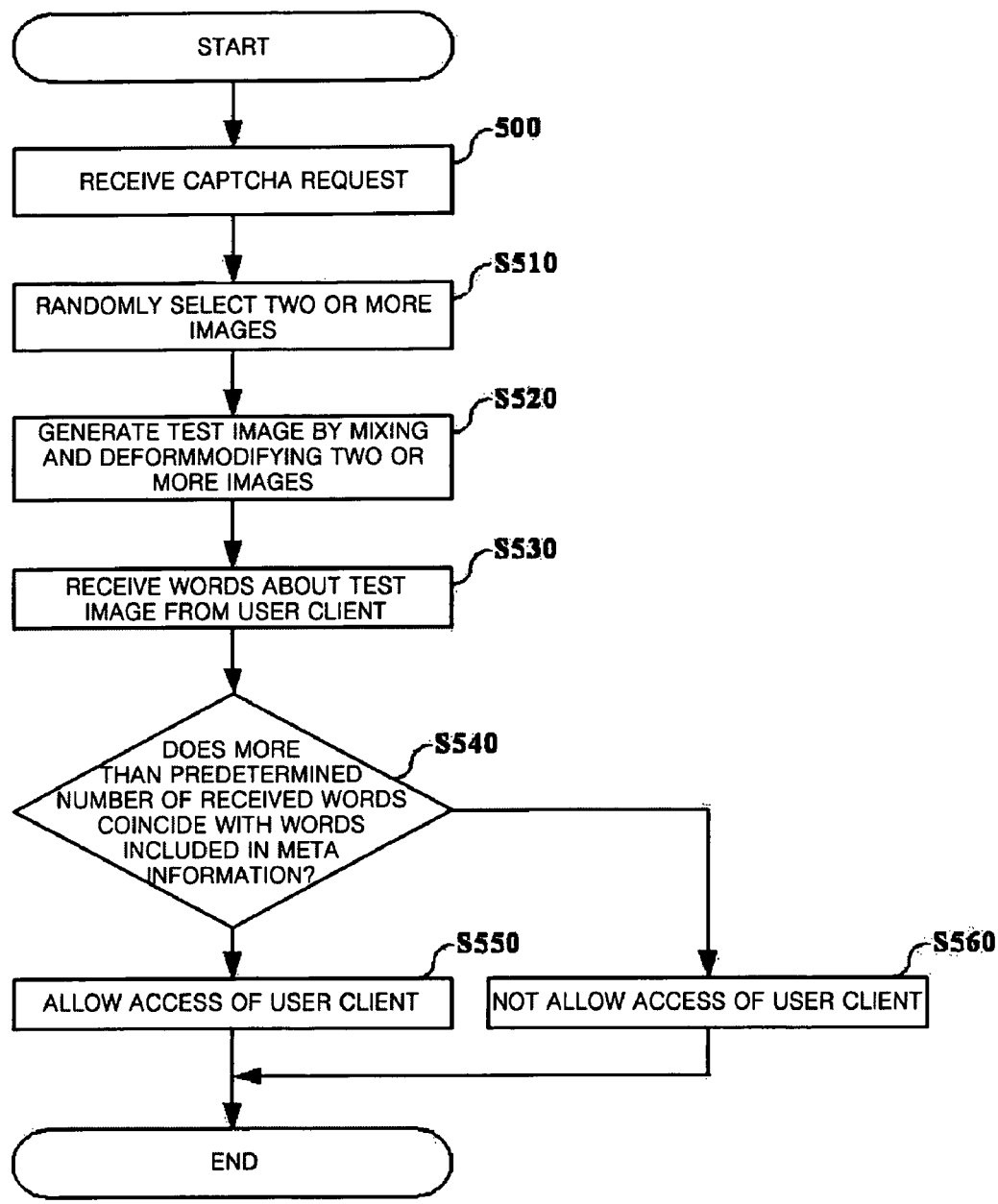
FIG. 8 is a flowchart illustrating a method of providing an image-based CAPTCHA according to a third preferred embodiment of the present invention.

The method of providing CAPTCHA through the stateful network is described in detail below with reference to FIG. 8. First, when a request for CAPTCHA is received from the user client (S500), two or more images corresponding to the request are randomly selected from the image database (S510). Then, the test image is generated by mixing or modifying the selected images (S520). Here, the methods of mixing and modifying images used in generating a test image are the same as those in the method of providing CAPTCHA through the stateless network.

Next, one or more words inputted by the user about the test image are received from the user client (S530), and the received one or more words are compared with one or more words included in the Meta information of each image (S540).

As a result of the comparison, if more than a certain number of words among the words inputted by the user coincide with the words included in the Meta information, user access is allowed (S550). Otherwise, it is not allowed (S560).

The test method using the afore-mentioned image-based CAPTCHA can be implemented in the form of a program that can be performed by various types of computers, and the program for performing the test method using the image-based CAPTCHA can be stored in any recording medium readable by a computer, such as a hard-disk drive, CD-ROM, DVD, ROM, RAM or flash memory.

The method and apparatus of the present invention has the advantages including the following:

First, because CAPTCHA is generated by mixing two or more images, the range of image modification can be extended, and the incapacitation by an AI technique can be prevented, thereby improving the accessibility for the CAPTCHA.

Second, because the test of CAPTCHA can be performed in a user client side, the transmission of unnecessary messages can be prevented, thereby lowering the load of a server.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The invention claimed is:

1. A method of providing an image-based completely automated public turing test to tell computer and humans apart (CAPTCHA), the method comprising the steps of:
   storing a plurality of randomly-selected images by session when a request for a web page is received from a user client;
   providing the web page and a session ID to the user client;
   generating a test image by mixing the plurality of images together as one image when a request for a test image corresponding to the session ID is received from the user client;
   transmitting the generated test image to the user client;
   receiving first identification information inputted by the user client about the test image; and
   comparing the first identification information with second identification information included in Meta information of the test image,
   wherein the session ID is provided along with the session start time information, hash values of the second identification information produced by a hash function, salt information for producing the hash values of the second identification, and signature value generated by signing the session start time information, the hash values of the second identification information, and the salt information using a secret key in the step of providing the web page.

2. The method of claim 1, further comprising the step of allowing user access when more than a predetermined number of the first identification information coincide with the second identification information.

3. The method of claim 1, wherein the mixing of the plurality of images in the step of generating the test image is performed by overlaying or substituting the images.

4. The method of claim 1, wherein at least one of the plurality of images is modified by image rotation, noise addition, erasure, distortion, brightness change, contrast change, blur, softness, image magnification, image reduction, image color replacement, or combination thereof in the step of generating the test image.

5. The method of claim 1, wherein the generating of the test image in the step of generating the test image comprises the steps of:
   mixing the plurality of images; and
   modifying at least one portion of the mixed image by image rotation, noise addition, erasure, distortion, brightness change, contrast change, blur, softness, image magnification, image reduction, image color replacement, or combination thereof.

6. The method of claim 1, wherein the plurality of images include a three-dimensional object.

7. The method of claim 1, wherein the plurality of images are photographed by an image-photographing means.

8. The method of claim 1, further comprising the step of determining the validity of the session using validity determination information before the step of comparing, wherein the validity determination information includes the session start time information, the hash values of the second identification information, the salt information, and the signature value received in the step of receiving the first identification information.

9. The method of claim 8, wherein the step of determining the validity of the session is performed by determining at least one of: whether the difference between the session start time information and a current time information is less than a first predetermined value; whether there is the first identification information received from the user client in the list of first identification information inputted by the user whose access is allowed; and whether the signature value generated by signing the session start time, the hash values of the second identification information, and the salt information using the secret key coincide with the signature values received from the user client.

10. The method of claim 1, wherein when the number of the second identification information is less than a second predetermined value, random numbers are added so that the number of the second identification information becomes the second predetermined value.

11. The method of claim 1, further comprising the step of terminating the session by deleting the session-related information after the step of providing the test image.

12. A method of providing an image-based CAPTCHA, the method comprising the steps of:
   storing a plurality of randomly-selected images by session when a request for a web page is received from a user client;
   providing the web page, a session ID, session start time information, hash values of first identification information for each of the plurality of images, salt information for producing the hash values of the first identification, and signature value generated by signing the session start time information, the hash values of the first identification information, and the salt information using a secret key to the user client;
   generating a test image by mixing the plurality of images when a request for the test image corresponding to the session ID is received from the user client; and
   transmitting the generated test image to the user client.

13. The method of claim 12, wherein the mixing of the plurality of images in the step of generating the test image is performed by overlaying or substituting the images.

14. The method of claim 12, wherein at least one of the plurality of images is modified by image rotation, noise addition, erasure, distortion, brightness change, contrast change, blur, softness, image magnification, image reduction, image color replacement, or combination thereof.

15. The method of claim 12, the generating of the test image in the step of generating the test image comprises the steps of:
   mixing the plurality of images; and
   modifying at least one portion of the mixed image by image rotation, noise addition, erasure, distortion, brightness change, contrast change, blur, softness, image magnification, image reduction, image color replacement, or combination thereof.

16. A method of providing an image-based CAPTCHA, the method comprising the steps of:
generating a test image by mixing a plurality of images;
providing the test image to a user client, the test image generated by mixing the plurality of images together as one image in response to a previous request from the user client;
receiving first identification information for identifying the test image from the user client; and
comparing the received first identification information with second identification information included in Meta information of the test image,
wherein the test image is provided along with hash values of the second identification information produced by a hash function, salt information for producing the hash values of the second identification, and signature value generated by signing the hash values of the second identification information, and the salt information using a secret key in the step of providing the test image.

17. The method of claim 16, wherein the generating the test image in the step of generating the test image comprises the steps of:
mixing the plurality of images by overlaying or substituting the images; and
modifying at least one portion of the mixed image by image rotation, noise addition, erasure, distortion, brightness change, contrast change, image magnification, image reduction, image color replacement, or combination thereof.

18. The method of claim 12, further comprising:
allowing user access when it is determined by the user client that more than a predetermined number of second identification information inputted by the user client about test image coincides with the first identification information.

* * * * *